United States Patent
Yamada et al.

(10) Patent No.: US 7,240,918 B2
(45) Date of Patent: Jul. 10, 2007

(54) AIRBAG WITH VENT HOLE

(75) Inventors: Ikuo Yamada, Aichi-ken (JP);
Michihisa Asaoka, Aichi-ken (JP);
Hironori Usami, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 240 days.

(21) Appl. No.: 10/752,584

(22) Filed: Jan. 8, 2004

(65) Prior Publication Data
US 2004/0150200 A1 Aug. 5, 2004

(30) Foreign Application Priority Data
Jan. 30, 2003 (JP) .............................. 2003-021407

(51) Int. Cl.
*B60R 21/276* (2006.01)
(52) U.S. Cl. .................................... 280/739; 280/743.1
(58) Field of Classification Search ................ 280/739, 280/743.1
See application file for complete search history.

(56) References Cited

U.S. PATENT DOCUMENTS 5,280,953 A * 1/1994 Wolanin et al. ............ 280/739
5,566,972 A * 10/1996 Yoshida et al. ........... 280/728.2
5,669,628 A * 9/1997 Kaufmann et al. ......... 280/739
5,839,755 A 11/1998 Turnbull
5,951,038 A * 9/1999 Taguchi et al. ............ 280/729
6,220,626 B1 * 4/2001 Utsumi et al. ............. 280/733
6,361,071 B1 * 3/2002 Denz et al. ................ 280/739
6,554,313 B2 * 4/2003 Uchida ...................... 280/729
6,648,371 B2 * 11/2003 Vendely et al. ............ 280/739
6,786,505 B2 * 9/2004 Yoshida ..................... 280/729
6,863,304 B2 * 3/2005 Reiter et al. ............... 280/739
6,932,386 B2 * 8/2005 Ikeda et al. ................ 280/739

FOREIGN PATENT DOCUMENTS

| JP | B2-H06-47363 | 6/1994 |
|---|---|---|
| JP | A-07-323806 | 12/1995 |
| JP | A-07-329695 | 12/1995 |
| JP | A-11-192916 | 7/1999 |
| JP | A-2000-016210 | 1/2000 |
| JP | A-2002-002439 | 1/2002 |
| JP | A-2004-196253 | 7/2004 |

* cited by examiner

*Primary Examiner*—Eric Culbreth
(74) *Attorney, Agent, or Firm*—Posz Law Group, PLC

(57) ABSTRACT

An airbag includes a fabric forming the airbag. The fabric has a vent hole for discharging some of gas introduced into the airbag to the outside. The vent hole is located at a position where the vent hole is not blocked when the airbag protects an occupant. This smoothly discharges gas, thereby improving the occupant protection performance.

9 Claims, 4 Drawing Sheets

AIRBAG WITH VENT HOLE

BACKGROUND OF THE INVENTION

The present invention relates to an airbag that is installed in a vehicle to protect an occupant of the vehicle.

For example, Japanese Examined Patent Publication No. 6-47363 discloses an airbag that is deployed to a predetermined position. Specifically, when protecting an occupant of a vehicle, the airbag is deployed and inflated while contacting structures in the passenger compartment, such as an instrument panel, a windshield, and a pillar garnish. Contacting the structures allows the airbag to be held at the predetermined position.

The airbag of the publication has vent holes for discharging gas that is supplied to the airbag for inflation and deployment to the outside. The vent holes prevent the internal pressure from being excessively increased, thereby effectively holding and protecting an occupant. Normally, the positions of the vent holes are determined such that discharged gas is directed away from the occupant.

When protecting an occupant, a typical airbag is pushed back by the occupant in a direction opposite to the direction of inflation and deployment. In other cases, the airbag is moved laterally. Accordingly, the airbag can contact structures in the passenger compartment at a relatively large area. This sometimes causes the vent holes to be partly or entirely blocked by the contacting structures. When blocked, the vent holes cannot smoothly discharge gas. It is thus difficult to improve the occupant protection performance of the airbag.

SUMMARY OF THE INVENTION

The present invention was made for solving the above problems in the prior art. Accordingly, it is an objective of the present invention to provide an airbag that smoothly discharges gas, thereby improving the occupant protection performance.

To achieve the foregoing and other objectives and in accordance with the purpose of the present invention, an airbag that is deployed and inflated to protect an occupant on a vehicle when an impact equal to or greater than a predetermined value is applied to the vehicle is provided. The airbag includes a fabric forming the airbag. The fabric has a vent hole for discharging some of gas introduced into the airbag to the outside. The vent hole is located at a position where the vent hole is not blocked when the airbag protects an occupant.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

An airbag 11 for front passenger seat according to one embodiment of the present invention will now be described with reference to FIGS. 1 to 4. First, an airbag device 10 using the airbag 11 will be described.

Figure 1:
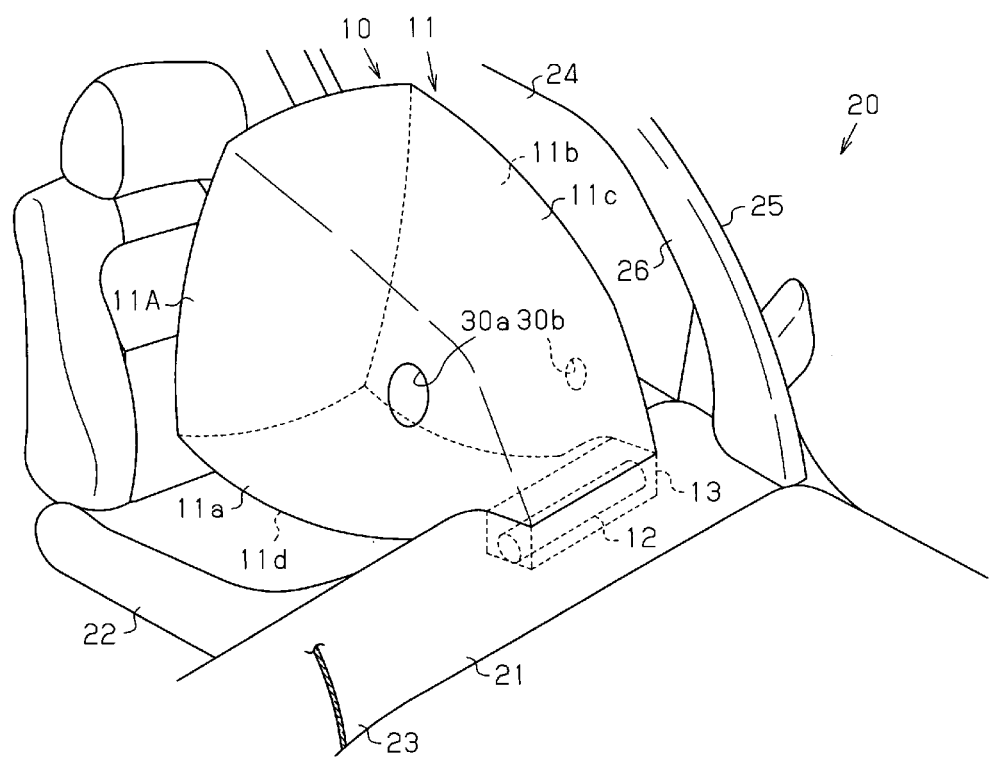
FIG. 1 is a partial perspective view illustrating a deployed and inflated airbag according to one embodiment of the present invention.

As shown in FIG. 1, the airbag device 10 includes the airbag 11, an inflator 12 for supplying gas to the airbag 11, and a case for accommodating the airbag 11 and the inflator 12. With the airbag 11 and the inflator 12 accommodated therein, the case 13 is fixed to a part of the instrument panel 21 that faces a front passenger seat 22. Thus, when operating (when the airbag 11 is deployed and inflated), the airbag device 10 holds and protects an occupant in the front passenger seat 22.

Figure 3A:
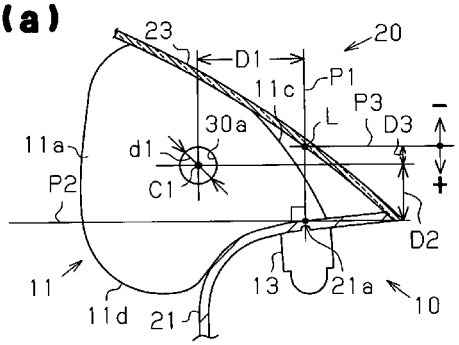
FIG. 3(a) is a side view showing a position of a large diameter vent hole.
Figure 3B:
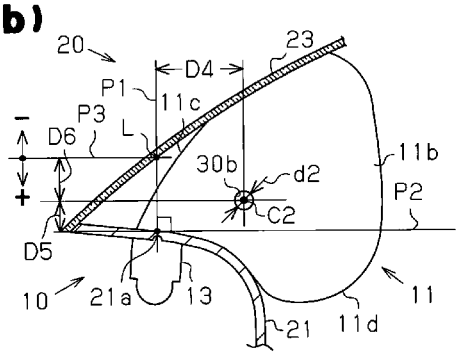
FIG. 3(b) is a side view showing a position of a small diameter vent hole.

When the airbag device 10 is activated, the airbag 11, during its deployment and inflation, breaks the instrument panel 21 at a tear line 21a (see FIGS. 3(a) and 3(b)) to form an opening of the case 13. The airbag 11 is then deployed and inflated in the passenger compartment. In this embodiment, the airbag 11 is shaped like a triangular prism when deployed and inflated. That is, the airbag 11 is triangular as viewed from either side of the vehicle and rectangular as viewed from either the front or the rear.

The airbag 11 is formed of airbag fabric 11A. When deployed and inflated, the airbag fabric 11A has an inner side 11a facing the lateral center of the passenger compartment and an outer side 11b facing the outside of the vehicle. Vent holes 30a, 30b are formed in the inner side 11a and the outer side 11b, respectively, for discharging gas supplied from the inflator 12 to the outside of the airbag 11, or to the passenger compartment.

Figure 2:
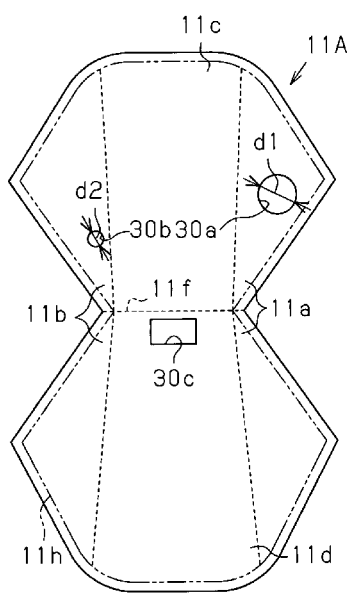
FIG. 2 is plan view illustrating fabric forming the airbag of FIG. 1.

FIG. 2 is a development of the airbag fabric 11A before being sewn. As shown in FIG. 2, the airbag fabric 11A has an upper side 11c and a lower side lid in addition to the inner side 11a and the outer side 11b. The airbag fabric 11A is folded at a center folding line 11f (broken line) and sewn at peripheral sewing lines 11h (alternate long and two short dashed lines). An opening 30c is formed in the airbag fabric 11A near the folding line 11f. The opening 30c is used for supplying gas to the airbag 11 from the inflator 12.

The vent holes 30a, 30b are located at positions where the vent holes 30a, 30b are not blocked by a windshield 23 and a door glass 24 at the front passenger seat 22 from the beginning of deployment and inflation of the airbag 11 to the completion of holding and protection of the occupant.

As shown in FIGS. 1 and 2, the opening area of the vent hole 30a formed in the inner side 11a is greater than the opening area of the vent hole 30b formed in the outer side 11b. In this embodiment, the vent holes 30a, 30b are circular. The diameter d1 of the inner side vent hole 30a is 70 mm. The diameter d2 of the outer side vent hole 30b is 40 mm.

The diameters d1, d2 of the vent holes 30a, 30b are not limited to the above listed values. As long as d1 is greater than d2 (d1>d2), the diameter d1 of the large vent hole 30a may be any value between 60 mm and 90 mm, inclusive, and the diameter d2 of the small vent hole 30b may be any value less than 60 mm. The ranges of the diameters d1, d2 are changed as necessary according to the arrangement of structures in the passenger compartment, such as the windshield 23, the door glass 24 at the front passenger seat 22, and a front pillar garnish 26.

If the diameter d1 of the large vent hole 30a is less than 60 mm, the vent hole 30a cannot discharge sufficient amount of gas in period from deployment and inflation of the airbag 11 to the completion of protection of the occupant. That is, the airbag 11 cannot have a desired gas discharging property.

If the diameter d1 of the large vent hole 30a is more than 90 mm, the amount of discharged gas will be excessive during the period. If the diameter d2 of the small vent hole 30b exceeds 60 mm, the area of the vent hole 30b is too large. In this case, if the airbag 11 is moved laterally by a load applied by an occupant, the vent hole 30b is likely to be blocked by the windshield 23, the door glass 24, or the front pillar garnish 26.

In this embodiment, the vent holes 30a, 30b are at the positions described below when the airbag 11 is deployed and inflated.

Referring to FIG. 3(a), the large vent hole 30a is formed at a position where a distance D1 between the center C1 of the vent hole 30a and a vertical reference plane P1 is 220 mm. The vertical reference plane P1 contains the laterally extending tear line 21a and extends vertically. Also, a distance D2 between the center C1 of the vent hole 30a and a first horizontal reference plane P2 is 70 mm. The first horizontal reference plane P2 contains the laterally extending tear line 21a and extends horizontally. Further, a distance D3 between the center C1 of the vent hole 30a and a second horizontal reference plane P3 is 80 mm. The second horizontal reference plane P3 contains a line L of intersection of the vertical reference plane P1 and the windshield 23, and extends horizontally.

Referring to FIG. 3(b), the small vent hole 30b is formed at a position where a distance D4 between the center C2 of the vent hole 30b and the vertical reference plane P1 is 90 mm. Also, a distance D5 between the center C2 of the vent hole 30b and the first horizontal reference plane P2 is 90 mm. Further, a distance D6 between the center C2 of the vent hole 30b and the second horizontal reference plane P3 is 60 mm.

Accordingly, as shown in FIGS. 2 to 3(b), the positions of the vent holes 30a, 30b are asymmetrical with respect to the lateral direction of the vehicle.

The distances D1 to D6 between the centers C1, C2 of the vent holes 30a, 30b and the reference planes P1 to P3 are not limited to the values listed above. Regarding the large vent hole 30a, the distance D1 may be any value between 50 mm and 400 mm, inclusive, the distance D2 may be any value between 50 mm and 200 mm, inclusive, and the distance D3 may be any value between −50 mm and 100 mm inclusive. In FIG. 3(a), the distance D3 has a negative value if the center C1 is higher than the second reference plane P3, and has a positive value if the center C1 is lower than the second reference plane P3. Regarding the small vent hole 30b, the distance D4 may be any value between 40 mm and 180 mm, inclusive, the distance D5 may be any value between 40 mm and 110 mm, inclusive, and the distance D6 may be any value between 40 mm and 110 mm inclusive. The distances D1 to D6 are changed as necessary according to the arrangement of the structures in the passenger compartment, such as the windshield 23, the door glass 24 at the front passenger seat 22, and the front pillar garnish 26.

If at least one of the distances D1 to D3 is out of the above listed ranges, the vent hole 30a is partly or entirely blocked with the instrument panel 21 or the windshield 23 temporarily during a period from deployment and inflation of the airbag 11 to the completion of the protection of the occupant. This reduces the amount of discharged gas. In other words, gas is not smoothly discharged.

If at least one of the distances D4 to D6 is out of the above listed ranges, the vent hole 30b is partly or entirely blocked with the windshield 23, the door glass 24, or the front pillar garnish 26 during deployment and inflation of the airbag 11 temporarily. This reduces the amount of discharged gas. In other words, gas is not smoothly discharged.

When the airbag 11 is deployed and inflated, part of the outer side 11b contacts the door glass 24 of the passenger seat 22, part of the upper side 11c (see FIG. 1) contacts the windshield 23, and part of the lower side 11d (see FIG. 1) contacts the instrument panel 21. However, the vent holes 30a, 30b are scarcely blocked by structures in the passenger compartment, such as the instrument panel 21, the windshield 23, the door glass 24, or the front pillar garnish 26.

When the deployed and inflated airbag 11 contacts an occupant in the front passenger seat 22 and starts holding the occupant, the airbag 11 is pushed back frontward. This increases the contacting area between each of the sides 11a to 11d and the corresponding structure in the passenger compartment.

As the occupant moves forward into the airbag 11, the inner side 11a of the airbag 11 starts contacting the instrument panel 21 and the windshield 23. As the occupant moves further forward, the contacting area of the inner side 11a increases. However, even if the airbag 11 is holding the occupant, the large vent hole 30a is not blocked by the instrument panel 21 or the windshield 23.

Figure 4A:
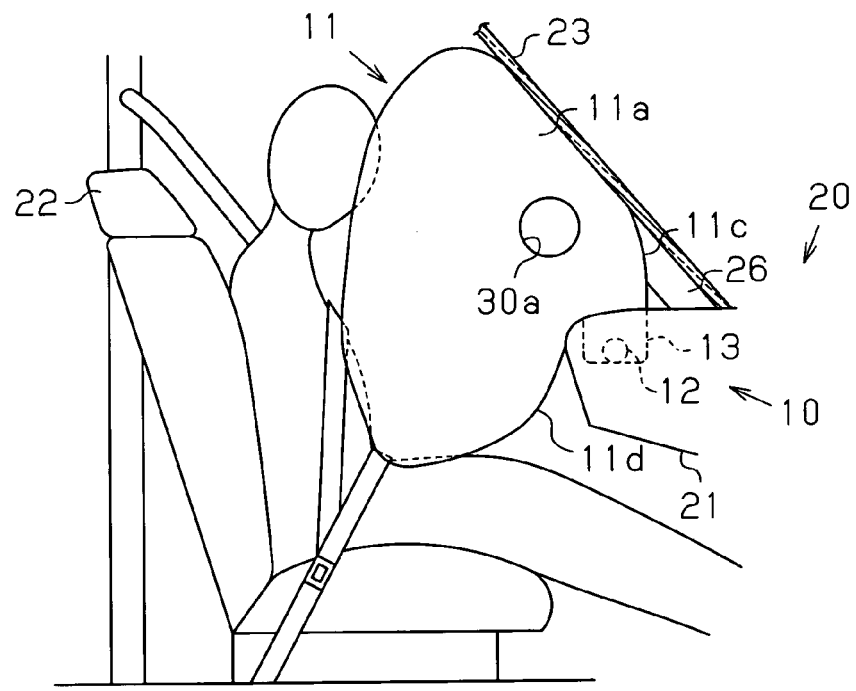
FIG. 4(a) is a side view illustrating the airbag when protecting an occupant, as viewed from a center of the passenger compartment.
Figure 4B:
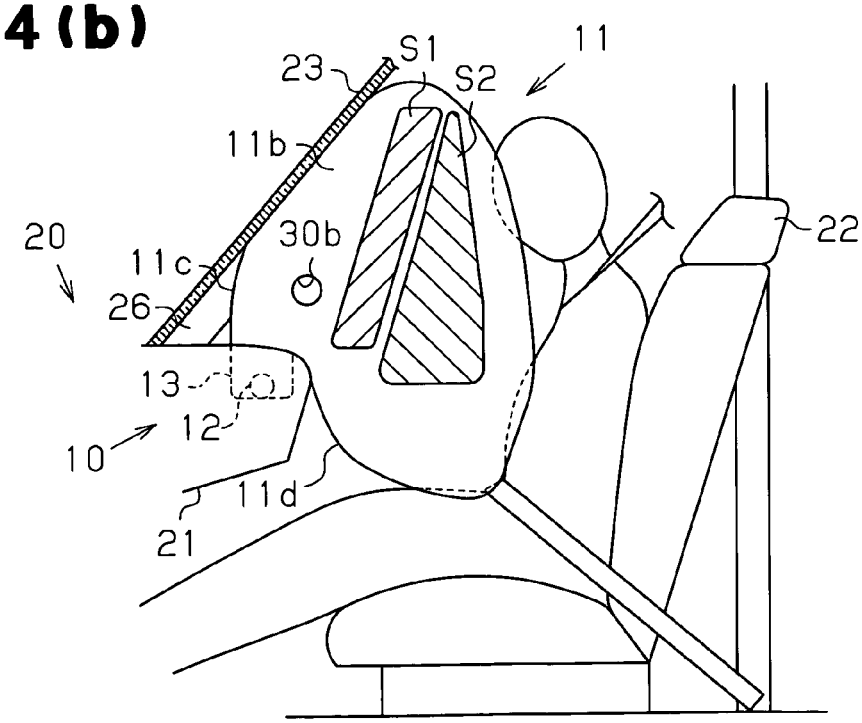
FIG. 4(b) is a side view illustrating the airbag when protecting an occupant, as viewed from the outside of the vehicle.

On the other hand, as shown in FIG. 4(b), as the occupant moves forward into the airbag 11, the contacting area between the outer side 11b and structures such as the instrument panel 21, the windshield 23, and the door glass 24 is increased. At this time, the outer side 11b contacts the front pillar garnish 26. However, even if the airbag 11 is holding the occupant, the small vent hole 30b is not blocked by the instrument panel 21, the windshield 23, the door glass 24, or the front pillar garnish 26. In FIG. 4(b), an area indicated by S1 is a part of the outer side 11b that contacts the front pillar garnish 26. An area indicated by S2 is a part of the outer side 11b that contacts the door glass 24.

This embodiment has the following advantages.

(1) In the above illustrated embodiment, the positions of the vent holes 30a, 30b of the airbag 11 are determined such that the vent holes 30a, 30b are not blocked by structures in the passenger compartment of the vehicle 20 when the airbag 11 protects an occupant in the front passenger seat 22, or during a period from when the airbag starts being deployed and inflated to when holding of the occupant is completed. Therefore, when the airbag 11 protects the occupant, gas is smoothly discharged through the vent holes 30a, 30b. This improves the occupant protection performance of the airbag 11.

(2) In the above illustrated embodiment, the vent hole 30a is formed in the inner side 11a of the airbag 11, which faces the center of the passenger compartment, and the vent hole 30b is formed in the outer side 11b of the airbag 11. The diameter of the vent hole 30a in the inner side 11a is set at 70 mm, and the diameter of the vent hole 30b in the outer side 11b is set at 40 mm. Therefore, the opening area of the vent hole 30a is greater than the opening area of the vent hole 30b.

Therefore, although the vent hole 30b is formed in the outer side 11b, which is likely to contact structures in the passenger compartment, such as the door glass 24 and the front pillar garnish 26, the vent hole 30b having a smaller opening area is unlikely to be blocked by those structures. The vent hole 30a is formed in the inner side 11a, which faces fewer structures than the outer side 11b. The opening area of the vent hole 30a is greater than the vent hole 30b formed in the outer side 11b, which permits gas to be smoothly discharged.

(3) In the above illustrated embodiment, the present invention is applied to the airbag 11 of the airbag device 10 for protecting an occupant in the front passenger seat 22.

Generally, in an area of the passenger compartment of the vehicle 20 that corresponds to deployment area of an airbag for the front passenger seat 22, a number of structures, such as the instrument panel 21, the windshield 23, the door glass 24, and the front pillar garnish 26 are provided. The airbag 11 partly and temporarily contacts structures in the passenger compartment during the period from the beginning of deployment and inflation to the completion of holding of the occupant. Particularly, when holding and protecting the occupant, the airbag 11 is deformed, and the contacting area between the airbag 11 and the structure in the passenger compartment is increased.

Even if the occupant is held and protected and the contacting area between the airbag 11 and structures in the passenger compartment is increased, the vent holes 30a, 30b are not blocked. Therefore, gas is smoothly discharged from the airbag 11. This improves the occupant protection performance. Therefore, the present invention is particularly preferable for the airbag 11 used in the airbag device 10 for the front passenger seat 22.

It should be apparent to those skilled in the art that the present invention may be embodied in many other specific forms without departing from the spirit or scope of the invention. Particularly, it should be understood that the invention may be embodied in the following forms.

Figure 5:
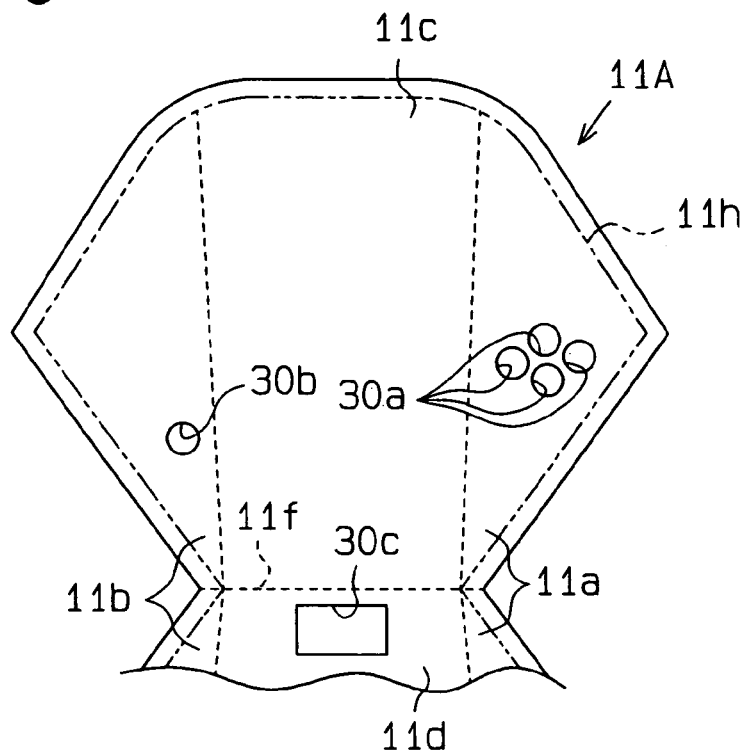
FIG. 5 is a plan view illustrating vent holes according to a modified embodiment.

As shown in FIG. 5, a plurality of vent holes 30a may be formed in the inner side 11a of the airbag fabric 11A. The total opening area of the vent holes 30a is greater than the opening area of the vent hole 30b formed in the outer side 11b. This modification has the advantage (2) of the embodiment of FIGS. 1 to 4(b).

Figure 6:
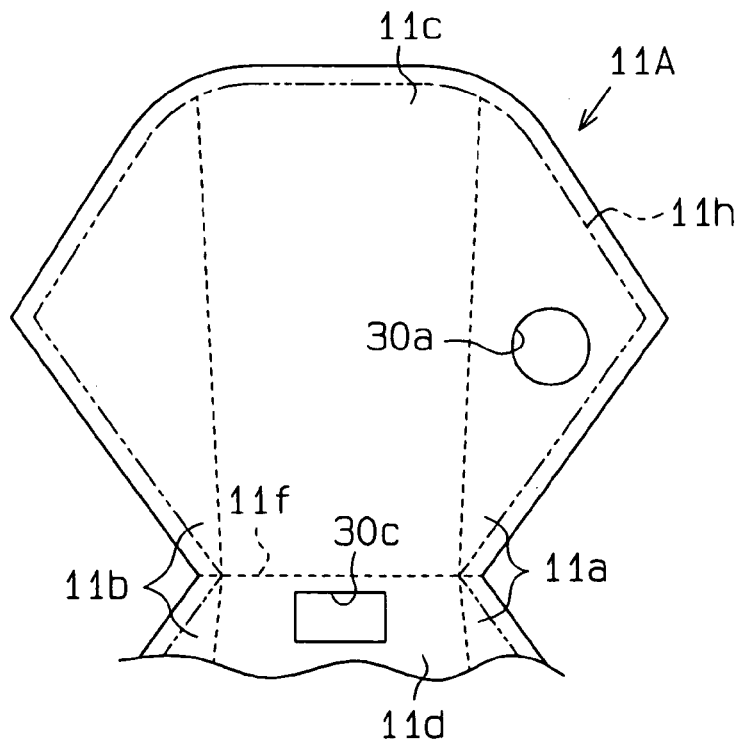
FIG. 6 is a plan view illustrating vent holes according to another modified embodiment.

As shown in FIG. 6, the vent hole 30b formed in the outer side 11b of the airbag fabric 11A may be omitted. That is, a vent hole 30a may be formed only in the inner side 11a of the airbag fabric 11A. In this configuration, the vent hole 30a is easily prevented from being blocked by the structures in the passenger compartment when the airbag 11 protects an occupant.

In the embodiments of FIGS. 1 to 6, the vent holes 30a, 30b need not be circular. The vent holes 30a, 30b may be, for example, elliptic or polygonal. Alternatively, the vent holes 30a, 30b may be formed as slits. In the case where the vent holes 30a, 30b are polygonal or formed as slits, the corners of the vent holes 30a, 30b are preferably rounded to avoid concentration of stress applied to portions in the vicinity of the vent holes 30a, 30b during deployment and inflation of the airbag 11.

Although the airbag 11 of the airbag device 10 for front passenger seat is described, the present invention may be applied to other types of airbags. For example, the present invention may be applied to the airbag of a side airbag device. Further, the present invention may be applied to the airbag in an airbag device for a rear seat, which airbag is deployed and inflated between an occupant in a rear seat and either a driver's seat or a front passenger seat.

Therefore, the present examples and embodiments are to be considered as illustrative and not restrictive and the invention is not to be limited to the details given herein, but may be modified within the scope and equivalence of the appended claims.

The invention claimed is:

1. An airbag tat is deployed and inflated to protect an occupant in a front passenger seat of a vehicle, the airbag comprising a fabric forming the airbag, wherein the fabric has first and second sides extending along the sides of the vehicle and opposite to each other in a lateral direction of the vehicle, wherein the fabric has a single vent hole formed only in the first side and a single vent hole formed only in the second side for discharging some gas introduced into the airbag to the outside, and wherein each vent hole is located at a position where the vent hole is unlikely to be blocked by the occupant or members forming the vehicle when the airbag, when inflated, protects the occupant, and wherein the opening area of the single vent hole in the first side is greater than the opening area of the single vent hole in the second side.

2. The airbag according to claim 1, wherein, when the airbag is expanded, the first side is located closer to a center of the vehicle in the lateral direction of the vehicle than the second side.

3. The airbag according to claim 1, wherein a diameter of the vent hole in the first side is in a range between 60 mm and 90 mm, inclusive.

4. The airbag according to claim 1, wherein a diameter of the vent hole in the second side is less than 60 mm.

5. An airbag tat is deployed and inflated to protect an occupant in a front passenger scat of a vehicle, the airbag comprising a fabric forming the airbag, wherein the fabric has first and second sides extending along the sides of the vehicle and opposite to each other in a lateral direction of the vehicle, wherein the fabric has a plurality of vent holes formed only in the first and second sides for discharging some gas introduced into the airbag to the outside, at least two of the vent holes being formed in the first side and only one of the vent holes being formed in the second side, and wherein each vent hole is located at a position where, when the airbag is inflated, the vent hole is unlikely to be blocked by the occupant or members forming the vehicle, and wherein the total opening area of the at least two vent holes in the first side is greater than the opening area of the one vent hole in the second side.

6. The airbag according to claim 5, wherein, when the airbag is expanded, the first side is located closer to a center of the vehicle in the lateral direction of the vehicle than the second side.

7. An airbag that is deployed and inflated to protect an occupant in a front passenger seat of a vehicle, the air bag comprising:

a fabric forming the airbag, wherein the fabric has first and second sides extending along the sides of to vehicle and opposite to each other in a lateral direction of the vehicle, wherein the fabric has at least two vent holes, formed only in the first and second sides, for discharging some of gas introduced into the airbag to the outside, each vent hole being formed in different one of the first and second sides, wherein each vent hole is located at a position where the vent hole is unlikely to be blocked by the occupant or members forming the vehicle when the inflated airbag protects the occupant, and wherein the vent holes are designed such that the total amount of gas discharged from the vent hole in the first side is greater than the total amount of gas discharged from the vent hole in the second side.

8. The airbag according to claim 7, wherein, when the airbag is expanded, the first side is located closer to a center of the vehicle in the lateral direction of the vehicle than the second side.

9. An airbag that is deployed and inflated to protect an occupant in a front passenger seat of a vehicle, the airbag comprising a fabric forming the airbag, wherein the fabric has first and second side surfaces extending along the sides of the vehicle and facing in the opposite directions with respect to a lateral direction of the vehicle, wherein, when the airbag is expanded, the first side surface is located closer to a center of the vehicle in the lateral direction of the vehicle than the second side surface, wherein the fabric has at least one vent hole formed only in the first side surface and at least one vent hole formed only in the second side surface for discharging some of gas introduced into the airbag to the outside, and wherein each vent hole is located at a position where the vent hole is unlikely to be blocked by the occupant or members forming the vehicle when the airing, when inflated, protects the occupant, wherein the at least one vent hole in the first side surface and the at least one vent hole in the second side surface are oriented in opposite directions, and wherein the total opening area of the at least one vent hole in the first side surface is greater than the total opening area of the at least one vent hole in the second side surface.

* * * * *